United States Patent [19]
Miller et al.

[11] Patent Number: 6,006,084
[45] Date of Patent: Dec. 21, 1999

[54] METHOD AND APPARATUS FOR PROVIDING BILLING SERVICES FOR A MOBILE GROUP OF COMMUNICATION SYSTEM USERS

[75] Inventors: Nathan West Miller, Tempe; Daniel Richard Tayloe, Phoenix; Kenneth Lee Sowles, Chandler; Baldev Sangha, Chandler; Robert Frederick, Chandler, all of Ariz.

[73] Assignee: Motorola, Inc., Schaumburg, Ill.

[21] Appl. No.: 08/863,595

[22] Filed: May 27, 1997

[51] Int. Cl.⁶ .................................. H04M 15/00
[52] U.S. Cl. .................... 455/406; 455/410; 455/427; 379/114
[58] Field of Search .................... 455/406, 408, 455/410, 422, 427, 430, 431; 379/114, 115, 156, 157; 380/177, 176

[56] References Cited

U.S. PATENT DOCUMENTS

| | | | |
|---|---|---|---|
| 4,399,330 | 8/1983 | Kuenzel | 179/2 EB |
| 5,519,761 | 5/1996 | Gilhousen | 455/431 |
| 5,559,865 | 9/1996 | Gilhousen | 455/431 |
| 5,596,624 | 1/1997 | Armbruster et al. | 379/58 |
| 5,640,673 | 6/1997 | Tanabe | 455/12.1 |
| 5,651,050 | 7/1997 | Bhagat et al. | 455/431 |
| 5,701,152 | 12/1997 | Chen | 348/3 |
| 5,805,680 | 9/1998 | Penzias | 379/114 |
| 5,805,683 | 9/1998 | Berberich | 379/142 |

FOREIGN PATENT DOCUMENTS

| | | |
|---|---|---|
| 06607767 A1 | 7/1994 | European Pat. Off. . |
| 2310973 | 9/1997 | United Kingdom ............. H04Q 7/38 |
| 2317074 | 3/1998 | United Kingdom ............. H04Q 7/38 |

*Primary Examiner*—Reinhard J. Eisenzopf
*Assistant Examiner*—Darnell R. Armstrong
*Attorney, Agent, or Firm*—Harold C. McGurk IV; Dana B. LeMoine; Frank J. Bogacz

[57] ABSTRACT

A method and apparatus used by a communication system (100) to register communication system users which use service provider equipment. Multiple-user and special purpose single-user communication units (110) are provided and/or operated by service providers. MCUs (110) can be located on mobile vehicles or in fixed locations. The system along with MCUs (110) collect registration information and usage information for individual users (440) and individual MCUs (110). Service providers receive billing information concerning the usage of their MCUs (110) by communication system users. After communication system (100) registers each user whose registration information is contained within the at least one combined request message, communication system (100) provides communication services to each user and billing information services to the service provider for the communications service and the service provider furnishing the communications equipment.

27 Claims, 4 Drawing Sheets

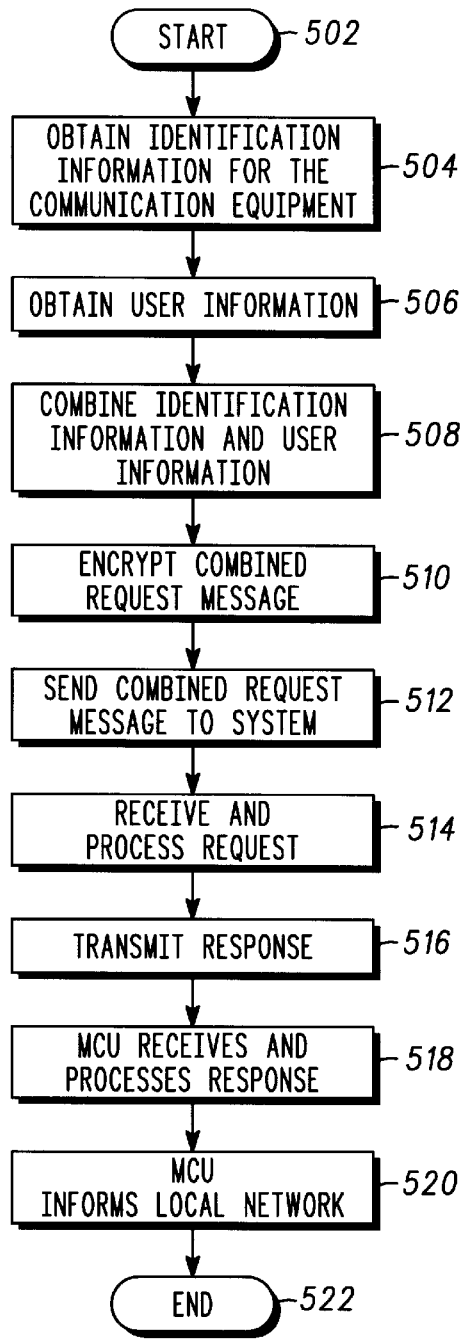
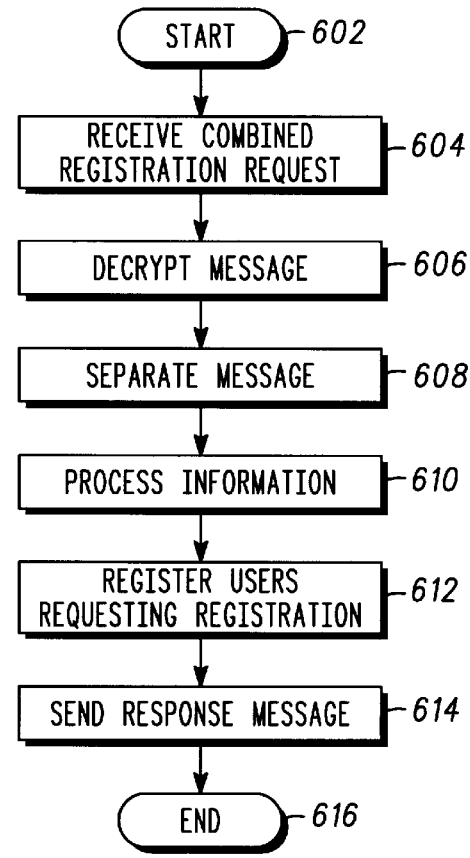
FIG. 5
FIG. 6

METHOD AND APPARATUS FOR PROVIDING BILLING SERVICES FOR A MOBILE GROUP OF COMMUNICATION SYSTEM USERS

FIELD OF THE INVENTION

The present invention relates generally to satellite communication systems. More specifically, the present invention relates to billing and settlement services provided in satellite communication systems that support multiple-user communication networks.

BACKGROUND OF THE INVENTION

A communication system user in a mobile communication system occasionally performs a service request procedure which can be used to inform the system of the communication system user's current location. Location registration is required to enable the system to contact the communication system user when an incoming communication attempt is destined for the communication system user. Location registration information is also useful for billing purposes. As the communication system user moves, the communication system user must occasionally re-register with the system.

The communication system users use various devices (e.g., a cellular telephone or pager) to communicate with other communication system users within the communication system. Each communication process involves an exchange of messages between the communication system user and the system. Registration is one of these communication processes. Each registration process involves an exchange of registration messages between the communication system user and the system. These registration messages contain only information concerning particular system users and do not contain any service provider information.

In existing cellular networks which use the "Global System for Mobile Communications" standards (referred to herein as GSM) for subscriber control and network behavior, no provision has been made to allow isolated local networks supporting more than one fixed telephone set to access a communication network using procedures for efficient resource utilization. Further, no provision has been made to allow service providers who operate and control these local networks to recover costs associated with providing these isolated local networks. These isolated local networks are generally so large that to allocate a radio access resource dedicated to each fixed telephone set would be economically and physically prohibitive.

The lack of service provider information is particularly trouble-some when groups of communication system users which are located on a mobile vehicle (e.g., communication units on-board an airplane) individually register with the system. Prior-art mobile group registration procedures require each communication system user to register individually with the system but provisions were not made to register service providers with the system. This lack of service provider information results in a large amount of non-revenue generating work which has to be performed to accurately identify and compensate the service providers.

Billing in GSM systems is based on the individual subscriber and not on the equipment being used. Under certain circumstances a provisioned subscriber may be constrained to, or prefer to use equipment owned by another agency. For instance, the use of a private mobile station might be prohibited on board a commercial airliner. However, the airliner might contain equipment which could be used for connection into the Public Land Mobile Network for a usage fee. If during use of the airliner equipment the previously provisioned subscriber would prefer to maintain his/her system identity (to provide a location for incoming calls, for instance) he/she might provide the previously provisioned Subscriber Information Module (SIM) to the airliner system. If this were to occur, the billing and settlement system would be able to identify the subscriber, but the service provider which provisioned the airline and the airline identification would be masked by the previously provisioned information on the SIM.

What is needed is a method and apparatus for billing individual members of a group of communication system users who are located in a mobile vehicle. Further needed is a method and apparatus to reduce the amount of non-revenue bearing work which has to be perform to accurately identify and compensate the service providers. What is also needed is a billing methodology which allows service providers to recover costs associated with providing user access to service provider furnished communications equipment.

BRIEF DESCRIPTION OF THE DRAWINGS

FIG. 5 illustrates a flowchart of a procedure for providing identification information for an MCU located on-board a mobile vehicle and providing user service information for a group of communication system users located on-board the mobile vehicle to a communication system in accordance with a preferred embodiment of the present invention; and FIG. 6 illustrates a flowchart of a billing and settlement procedure for an MCU and one or more users in accordance with a preferred embodiment of the present invention.

DETAILED DESCRIPTION OF A PREFERRED EMBODIMENT

The method and apparatus of the present invention enable billing individual members of a group of communication system users who are located and, more particularly, users who are located in a mobile vehicle. Also, the method and apparatus of the present invention reduce the amount of non-revenue bearing work which must be perform to accurately compensate the service providers. The method comprises determining the identification information for the MCU on the mobile vehicle and collecting user service information from multiple system users who are located on a mobile vehicle. The method further comprises sending the identification information for the MCU on board the mobile vehicle along with the collected user service information for the multiple system users who are located on a mobile vehicle to the system.

The term "call" as used herein, is not limited to telephone calls, but refers to any type of communication between communication devices. A "satellite" is defined herein to mean a man-made object or vehicle intended to orbit the earth and includes both geostationary and orbiting satellites. A "constellation" is defined herein to mean an ensemble of satellites arranged in orbits for providing specified coverage (e.g., radio communication) of portion(s) or all of earth. A constellation typically includes multiple rings (or planes) of satellites and can have equal numbers of satellites in each plane, although this is not essential. As used herein the terms "cell" and "antenna pattern" are not intended to be limited to any particular mode of generation and include those created by either terrestrial or satellite cellular communications systems and/or combinations thereof. The present invention is applicable to systems including satellites having low-earth, medium-earth and geo-synchronous orbits. Additionally, it is applicable to orbits having any angle of inclination (e.g., polar, equatorial or other orbital patterns).

Figure 1:
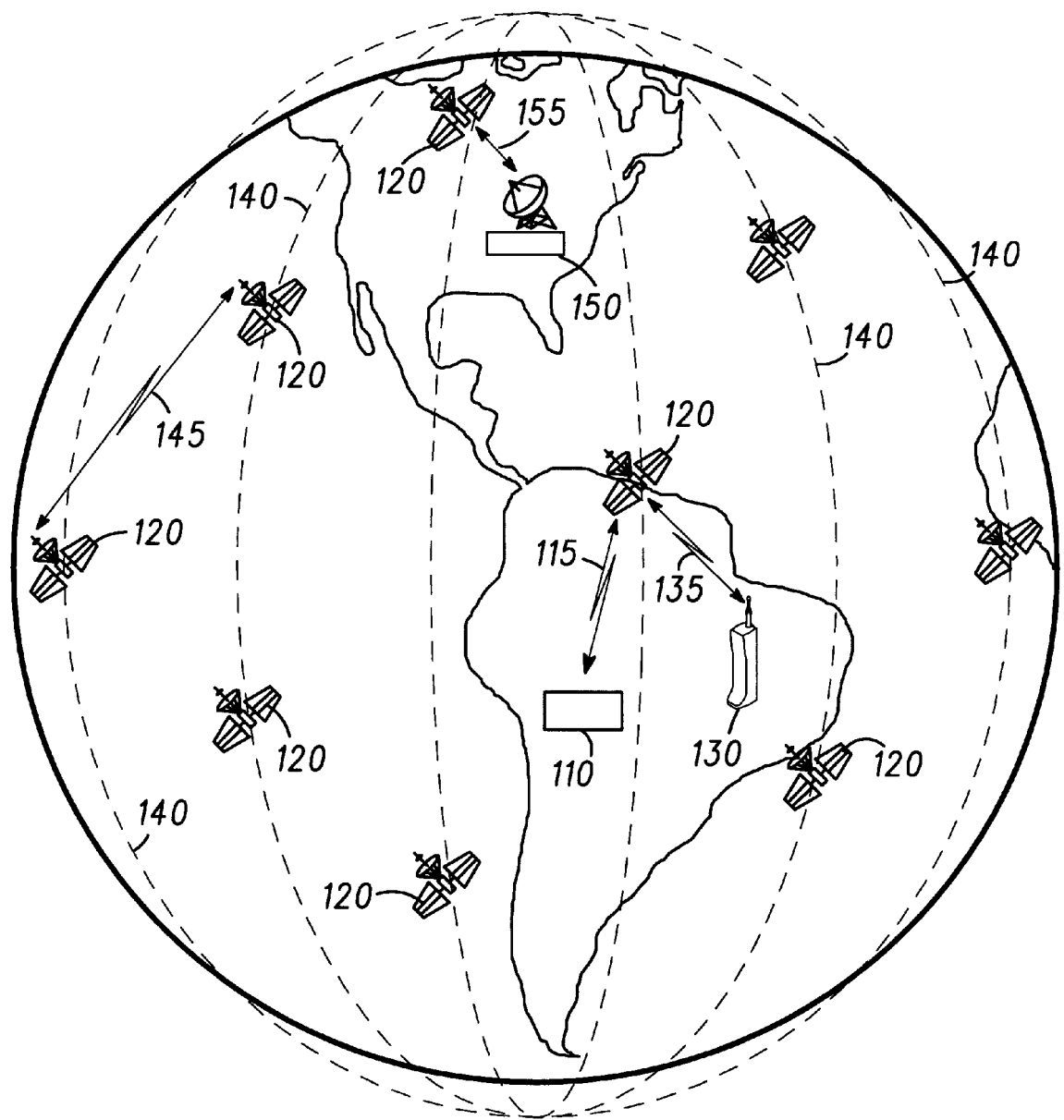
FIG. 1 illustrates a highly simplified diagram of a satellite-based communication system in accordance with a preferred embodiment of the present invention.

FIG. 1 illustrates a highly simplified diagram of a satellite-based communication system in accordance with a preferred embodiment of the present invention. Communication system 100 comprises multiple-user communication units (MCUs) 110, communication satellites 120, single-user communication units (CUs) 130, and terrestrial stations 150.

Communication satellites 120 are illustrated using six polar orbits 140, with each orbit 140 holding eleven satellites 120 for a total of sixty-six satellites 120. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few of satellites 120.

In a preferred embodiment, each orbit 140 encircles earth at an altitude of around 780 km, although higher or lower orbital altitudes may be usefully employed. For the example shown, satellites 120 travel with respect to earth at around 25,000 km/hr. This allows satellite 120 to be visible to an MCU 110, terrestrial station and/or CU 130 for a maximum period of approximately nine minutes. Because of the relative movement between communication satellites 120 and MCUs 110, communication link 115 is a temporary one and hand-off schemes are employed to realize a continuous communication channel.

Communication satellites 120 communicate with MCUs 110 which can include a number of radio communication transceivers using communication links 115. Communication satellites 120 communicate with terrestrial stations 150 using communication links 155. Communication satellites 120 communicate with communication units 130 using communication links 135. Terrestrial stations 150 can include earth terminals (ETs). Terrestrial stations 150 can be system control centers or connected to one or more system control centers. Terrestrial stations 150 can also be gateways or connected to one or more gateways (GWs), which provide access to a public switched telephone network (PSTN) or other communications facilities. One MCU 110 and one terrestrial station 150 are shown in FIG. 1 for clarity and ease of understanding.

Communication units 130 may be located anywhere on the surface of the earth or in the atmosphere above the earth. Communication units 130 are preferably communications devices capable of transmitting data to and receiving data from communication satellites 120. By way of example, communication units 130 may be hand-held, portable cellular telephones adapted to communicate with communication satellites 120. Ordinarily, communication units 130 need not perform any control functions for communication system 100.

MCUs 110 may also be located anywhere on the surface of the earth or in the atmosphere above the earth. MCUs 110 are generally located on vehicles of a type designed to transport groups of passengers. For example, MCUs 110 could be located on busses, ships, monorails, and airplanes, although this list is not exhaustive.

MCUs 110 are preferably communications devices capable of transmitting data to and receiving data from communication satellites 120 on many different channels at the same time. Ordinarily, MCUs 110 need not perform any control functions for communication system 100 but may provide control functions for a local network on a mobile vehicle.

Communication system 100 can accommodate a large number of MCUs 110. In a preferred embodiment of the present invention, MCUs 110 communicate using communication equipment (not shown) located on the MCU. The communication equipment is used to establish links 115 with nearby communication satellites 120.

Links 115 encompass a limited portion of the electromagnetic spectrum that is divided into numerous channels. Links 115 are preferably combinations of L-Band frequency channels and can encompass Frequency Division Multiplex Access (FDMA) and/or Time Division Multiple Access (TDMA) and/or Code Division Multiple Access (CDMA) communications or combination thereof.

At a minimum, satellite 120 continuously transmits over one or more broadcast channels. MCUs 110 synchronize to at least one broadcast channel and monitor at least one broadcast channel to detect data messages which are addressed to them. MCUs 110 can-transmit messages to communication satellites 120 over one or more acquisition channels. Broadcast channels and acquisition channels are not dedicated to any one MCU but are shared by all MCUs 110 and CUs 130 currently within view of satellite 120.

Traffic channels are two-way channels that are assigned to particular MCUs 110 and CUs 130 by communication satellites 120 from time to time. In the preferred embodiments of the present invention, a digital format is used to communicate data over all channels, and traffic channels support real-time communications. At least one traffic channel is assigned for each call, and each traffic channel has sufficient bandwidth to support, at a minimum, a two-way voice conversation. To support real-time communications, a TDMA scheme is desirably used to divide time into frames, preferably in the 60–90 millisecond range.

Communication satellites 120 communicate with other nearby communication satellites 120 through cross links 145. Thus, a message from MCU 110 located at any point on or near the surface of the earth can be routed through the constellation of communication satellites 120 to within range of substantially any other point on the surface of the earth. A message can be routed down to CU 130 on or near the surface of the earth from satellite 120 using subscriber link 160. Alternatively, a message may be routed down to or up from any of many terrestrial stations 150, of which FIG. 1 shows only one, through earth links 155. Terrestrial stations 150 are preferably distributed over the surface of the earth in accordance with geopolitical boundaries.

In a preferred embodiment, each satellite 120 can send messages to four terrestrial stations 150 and over a thousand CUs 130 at any given instant. In addition, a message can be routed down to or up from any of many MCUs 110, of which FIG. 1 shows only one, through links 115. MCUs 110 are preferably distributed around the earth. In a preferred embodiment, each MCU 110 can support up to a hundred channels with communication satellites 120 at any given instant.

At least one terrestrial station is coupled to each one of the MCUs through the communication satellites. The terrestrial station is responsible for maintaining data records for the MCU. Data records can include call data records (CDR), location information, user information and service provider information. User information can include current members of the group assigned to the MCU (which system users are aboard which aircraft). Also, the status for the users and the mobile equipment is stored by one of the terrestrial stations. This information can include the state of the transceivers on the MCU.

In addition, terrestrial stations 150 desirably monitor the health and status of communication system 100 and manage the operations of communication system 100. Terrestrial stations 150 desirably include antennas and RF transceivers and preferably perform telemetry, tracking and control functions for the constellation of communication satellites 120.

Also, terrestrial stations 150 can perform call processing functions in conjunction with communication satellites 120 or terrestrial stations 150 can exclusively handle call processing and allocation of call handling capacity within communication system 100. Diverse terrestrial-based communications systems, such as the PSTN, may access communication system 100 through terrestrial stations 150.

Figure 2:
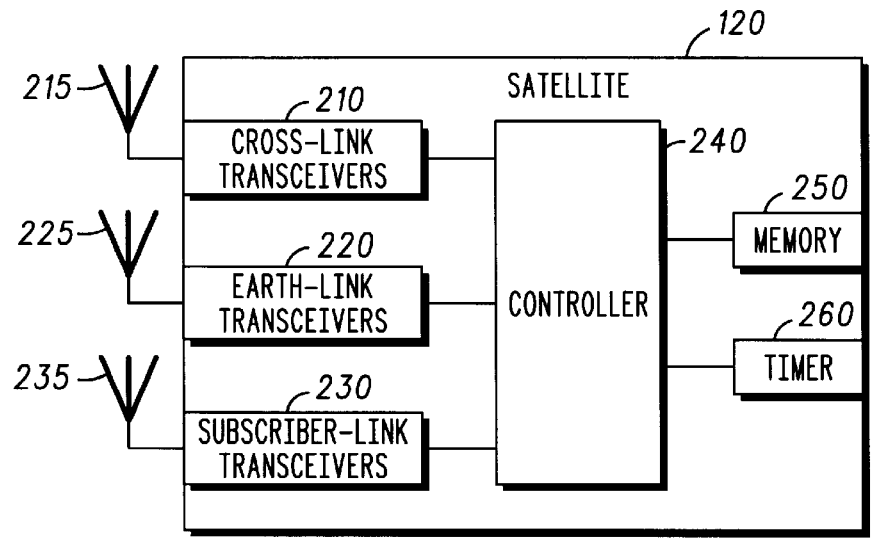
FIG. 2 illustrates a simplified block diagram of a communication satellite in accordance with a preferred embodiment of the present invention.

FIG. 2 illustrates a simplified block diagram of a communication satellite in accordance with a preferred embodiment of the present invention. Preferably, all communication satellites 120 within communication system 100 (FIG. 1) include equipment as illustrated by the block diagram of FIG. 2. Satellite 120 (FIG. 1) includes cross-link transceivers 210 and associated antennas 215. Transceivers 210 and antennas 215 support cross-links to other nearby communication satellites 120. Earth-link transceivers 220 and associated antennas 225 support earth-links to communicate with terrestrial stations 150 (FIG. 1). Subscriber-link transceivers 230 and associated antennas 235 support CUs 130 (FIG. 1). Preferably, each satellite 120 can simultaneously support links for at least one MCU 110 (FIG. 1), and up to a thousand or more of CUs 130 (FIG. 1). Of course, those skilled in the art will appreciate that antennas 215, 225, and 235 can be implemented either as single multi-directional antennas or as banks of discrete antennas. It is desirable that each subscriber-link antenna 235 be a phased array antenna capable of supporting many cells simultaneously.

Controller 240 couples each of transceivers 210, 220, and 230 as well as to memory 250 and timer 260. Controller 240 can be implemented using one or more processors. Controller 240 includes processors and uses timer 260 to maintain, among other things, the current date and time. Memory 250 stores data that serve as instructions to controller 240 and that, when executed by controller 240, cause satellite 120 to carry out procedures to control the operation of satellite 120. In addition, memory 250 includes variables, tables, and databases that are manipulated during the operation of satellite 120.

Subscriber-link transceivers 230 are desirably multi-channel FDMA/TDMA transceivers capable of transmitting and receiving on all different selectable frequencies during particular, selectable, time-slots as directed by controller 240. Subscriber-link transceivers 230 contain multi-channel radios having sufficient number of channels to provide the desired number of transmission and reception frequencies for establishing communication channels with at least one MCU and at least one of a plurality of CUs. Communication channels are used for signal access, signal control, and for the user voice and/or data. Controller 240 can provide for allocation of the frequency and time-slot assignments, cell-to-cell hand-off and other overhead and management and control functions. Subscriber-link transceivers 230 desirably provide for transmission and reception on any frequency channel set so that each subscriber link transceiver 230 can, when needed, utilize the entire spectral capacity of all frequency channel sets by having the capability to handle all frequency and time-slot assignments.

Figure 3:
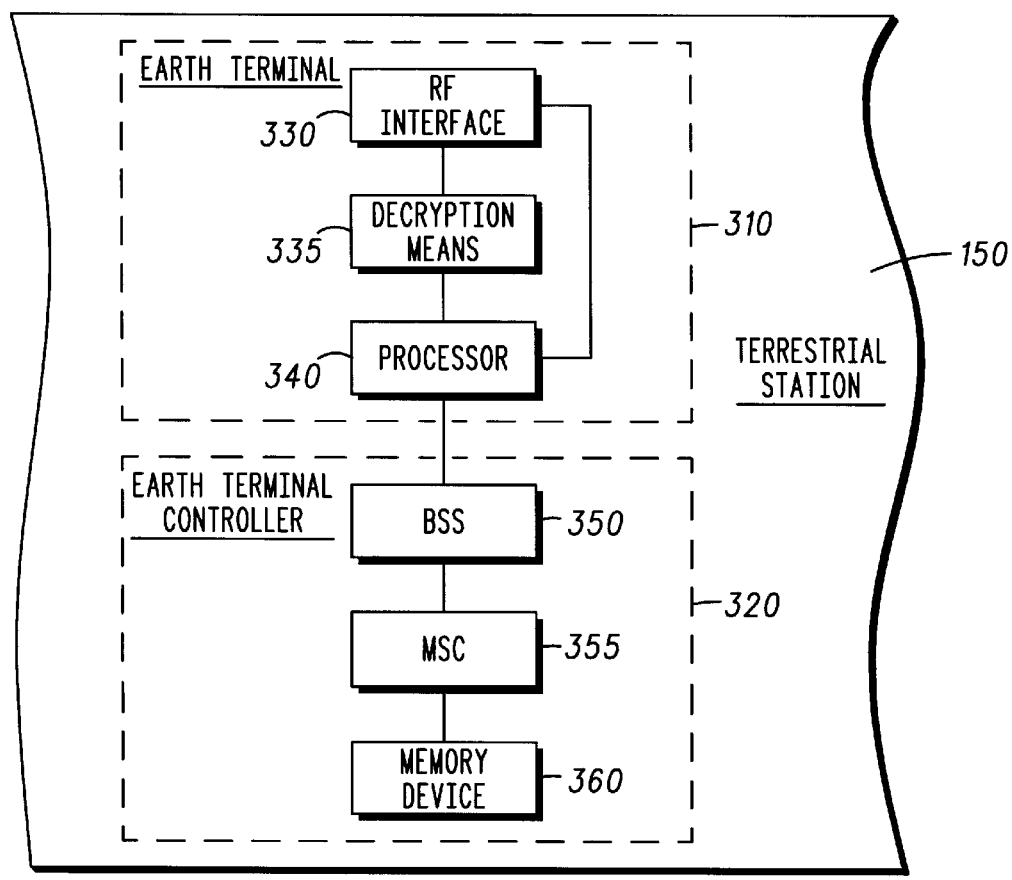
FIG. 3 illustrates a simplified block diagram of a terrestrial station which supports registration, call setup and billing for communication system users in accordance with a preferred embodiment of the present invention.

FIG. 3 illustrates a simplified block diagram of a terrestrial station which supports registration, call setup and billing for communication system users in accordance with a preferred embodiment of the present invention. Terrestrial stations 150 provide these and other user services for communication system users. Terrestrial station 150 can be a system control center or can be part of a system control center. Terrestrial station 150 can be a gateway or can be part of a gateway.

Terrestrial station 150 comprises earth terminal (ET) 310 which provides an RF interface to communication satellites 120 (FIG. 1) and earth terminal controller (ETC) 320 which provides an interface to terrestrial based communication systems. ET 310 communicates with ETC 320 over link 315. Link 315 can be a hard-wired or RF link.

The principle functions of ET 310 include managing radio channels and transferring signaling information to and from MCUs and other communication devices such as CUs.

ETC 320 comprises Base Station Subsystem 350 (BSS), Mobile Switching Center 355 (MSC), and memory devices 360. BSS 350 provides and manages transmission paths between CUs and MSC 355. MSC 355 is a point where user authentication is performed and where communications transit between the system and another network (e.g., a PSTN or other communication network). To determine whether a communication system user is allowed to use the system's services, information identifying the communication system user, the MCU and the location is sent from BSS 350 to MSC 355. After receiving this information, MSC 355 performs an authentication procedure to determine whether the MCU and the communication system user are authorized to use the system. For an MCU in roaming mode, MSC 355 also determines whether the service provider and the user's home system have an agreement in place which ensures that the service provider will receive compensation for service it provides to the communication system user.

In a preferred embodiment, memory devices 360 are coupled to MSC 355. Memory devices 360 are typically one or more memory storage devices which contain the last known locations of communication system users registered with the system. Where a communication system user is located with a mobile vehicle, the location information describes the last-known location of the mobile vehicle. The location information can be received as part of the user service information or in a message from the communication system.

Although BSS 350 and MSC 355 are names of devices familiar to those of skill in the art, the functions of the BSS 350 and MSC 355 for the purposes of this description are explained herein. Limitations associated with the use of these names in other contexts are not intended to limit the scope of the present invention.

MSC 355 is preferably similar to a telephone switching office for mobile originated and mobile terminated calls.

These calls can be from or to a single user using an MCU. MSC 355 provides an interface to a PSTN, and to the terrestrial circuits of ETC 320. MSC 355 communicates and passes signaling and traffic data to ETC 320 which provides for remote switching, distributed control, and traffic concentration. MSC 355 also provides call control functions such as number translations and routing, matrix path control, and allocation of outgoing trunks. MSC 355 desirably collects call billing data, formats the data into records, and sends these records to a billing center. MSC 355 can also collect traffic statistics for billing and management purposes.

In a preferred embodiment, MSC 355 occasionally receives and processes registration information for users of the system. MSC 355 receives the MCU's identification information and location information from the MCU. For system users who are located on the mobile vehicle, MSC 355 receives users' registration information from the MCU. As will be described below, the MCU identification information, location information, and the registration information for multiple users are collected at the MCU by a processor and sent to MSC 355 as one or more combined messages.

Memory devices 360 can contain a home location register (HLR) database which manages communication system user data and keeps track of a MCU's location as it roams around the earth. The HLR database is a reference data base for the MCU's parameters. For example, MCU's parameters can include information concerning the classification as a single user or a multi-user device. Parameters can also include information concerning the classification as a low speed or high speed platform. Various MCU identification numbers and addresses are stored within memory devices 360, as well as authentication parameters, services subscribed, and special routing information. Current MCU status is also preferably maintained, including a MCU's temporary roaming number and associated visitor location register (VLR) when roaming. This data can be remotely accessed by the MSCs. ETC 320 desirably includes an authentication center which is responsible for protecting against fraudulent MCU and system use.

Memory devices 360 can also contain a VLR database which preferably contains a copy of most of the data stored in the HLR database. This data is a temporary entry which exists only as long as a particular MCU is known to be operating within the area served by the VLR database. The VLR database provides a local database for an MCU which eliminates unnecessary interrogations of the HLR database. The VLR database may contain some duplicate memory devices data as well as more precise location information and status. The VLR database is used to help manage MCU data and keep track of the location of the MCUs.

Figure 4:
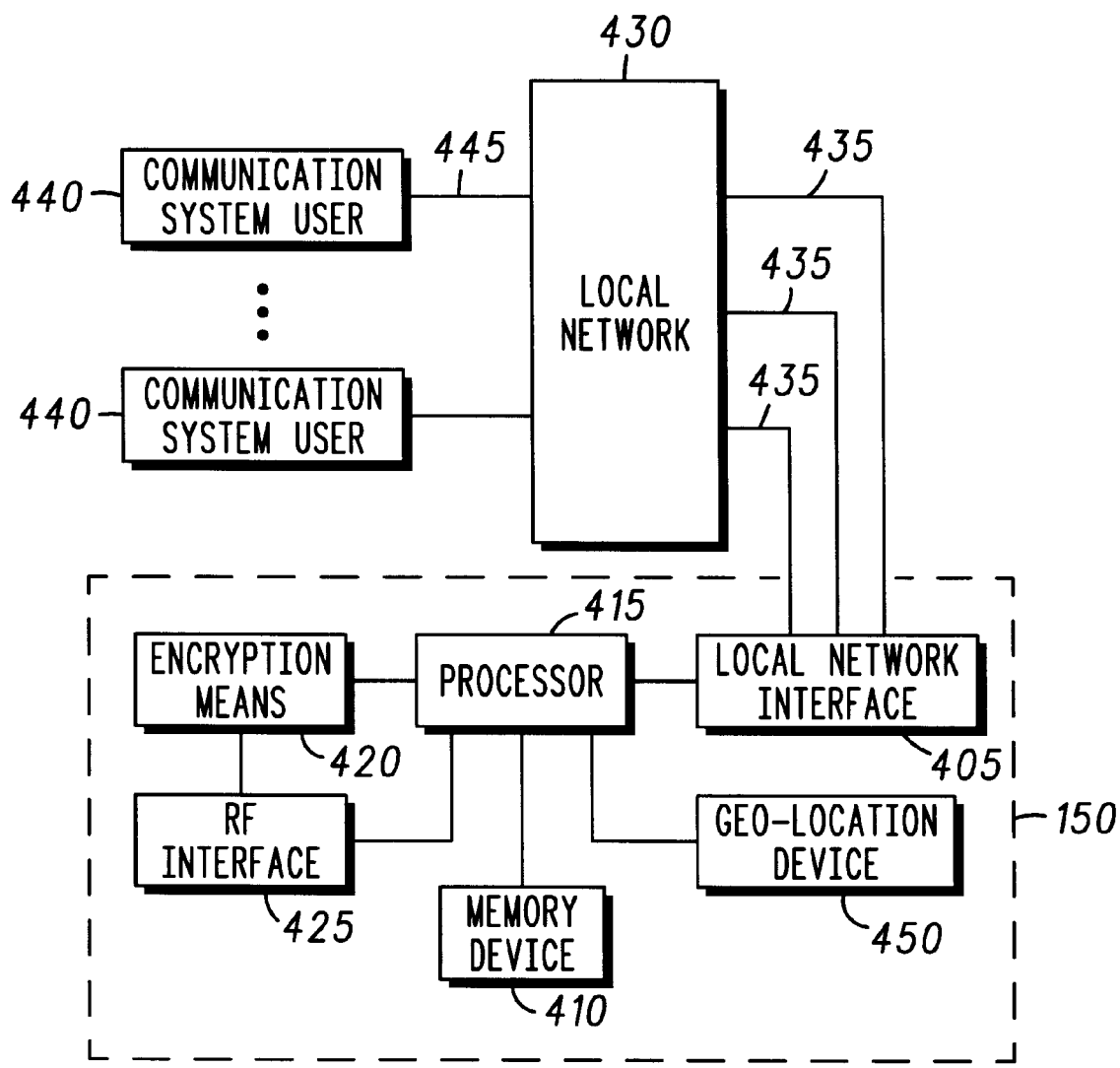
FIG. 4 shows a simplified block diagram of a multiple-user communication unit (MCU) and associated components in accordance with a preferred embodiment of the present invention.

FIG. 4 shows a simplified block diagram of a multiple-user communication unit (MCU) and associated components in accordance with a preferred embodiment of the present invention. MCU 110 (FIG. 1) is used along with local network 430 to provide communication capabilities for multiple communication system users 440, where MCU 110, local network 430, and communication system users 440 are located on a mobile vehicle. In a preferred embodiment, MCU 110 includes processor 415, local network interface 405, RF interface 425, memory device 410, geo-location device 450, and encryption means 420. In alternate embodiments, MCU 110 need not include encryption means 420 and/or memory device 410 and/or geo-location device 450. Processor 415 manages all communication activity in real time.

In a preferred embodiment of the present invention, the IMEI (International Mobile Equipment Identity) intrinsic to all mobile equipment is used to identify MCU 110. In the case of service provider furnished subscriber equipment, the communication system correlates the IMEI with the service provider. There is an IMEI field in the Call Detail Record and provides a unique identification for a specific equipment which is independent of the SIM information.

In an MCU, a single IMEI or a range of IMEIs is assigned for all of the radio (L-Band) channels controlled by that MCU. In alternate embodiments, an IMEI could be assigned to a single channel or groups of channels. This MCU signaling implementation is based on a separation of the radio channel equipment within the MCU from the associated logical channel assignment (i.e. TMSIs). For example, both the MCU and ETC 320 (FIG. 3) can maintain a unique list for IMSIs/MSISDNs and IMEIs.

Alternate embodiments also allow instances in which an MCU is used by a single user. In this case, the system could pre-assign IMEIs to Service Providers likely to offer such a service. For example, companies involved with hiking, mountain-climbing, white-water rafting or canoeing might offer an MCU rental service.

Local network interface 405 enables processor 415 to exchange data and messages with local network 430 over links 435. Communication system users 440 exchange data and messages with local network 430 over links 445. Links 435 and/or 445 can be hard-wired or RF communication links. Data and messages exchanged between processor 415 and communication system users 440 via local network 430 include, but are not limited to, user registration information, registration status information, billing information, call setup information, and speech/data/fax information.

Processor 415 processes information from those users of communication system users 440 who request to register and/or who request to use other user services while communicated with the communication system via the MCU. Processor 415 determines location information for the MCU using geo-location device 450. In an alternate embodiment, processor performs location determining procedures using information from the communication system. Processor 415 also creates one or more combined request messages which contain identification information for the MCU, geo-location information and individual user service information for each user of the group and sends the combined request messages via RF interface 425 to the communication system. In a preferred embodiment of the present invention, the user service information is registration information. In alternate embodiments, the user service information can be call setup information or other call processing information.

In a preferred embodiment, the combined request messages are encrypted by encryption means 420 prior to sending the combined request messages to the communication system. In an alternate embodiment, messages are not encrypted and encryption means 420 is not necessary.

In a preferred embodiment, processor 415 also receives one or more response messages via RF interface 425 from the communication system. The response messages include information which indicates which of the multiple communication system users 440 were successfully or unsuccessfully registered by the communication system. In an alternate embodiment, processor 415 receives individual registration response messages for each communication system user 440.

Via local network interface 405, processor 415 then informs each of the communication system users 440 which wanted to register whether or not the registration attempt for that communication system user 440 was successful.

Memory device 410 is used to store information which processor 415 requires in order to perform its necessary functions. Memory device 410 can be a random access memory, read only memory, or any other type of storage medium and can be integral with or separate from processor 415.

For example, memory device 410 could include status information for the RF interface which indicates problems with the communication link to the system satellites. In addition, memory device 410 could be used to store the location information for the MCU. Also, memory device 410 could be used to store the identification information for the MCU.

Memory device 410 can also include the user's registration information which could be used for occasional future registration attempts. For example, when the vehicle travels a pre-defined re-registration distance from the location where the vehicle last registered, MCU can re-register those previously registered users. This could be done if the vehicle crosses a gateway boundary. Rather than prompting the users for their registration information again, processor 415 could extract each user's registration information from memory device 410. In an alternate embodiment, this feature is not provided and memory device 410 might not be required.

The functions which MCU may perform include but are not limited to: error correction, voice coding/conversion, echo cancellation, buffering, cellular system and exchange signaling, supervision, and call management. Local network interface 405 desirably supports the protocols necessary to transfer data to local network 430. Processor 415 provides the call setup and tear-down sequencing and other management procedures of transceivers in RF interface 425.

Processor 415 is responsible for layer three and application protocols; call control, mobility management, and radio resource management.

RF interface 425 is also responsible for time and frequency accuracy, modulation and demodulation, frequency conversion, amplification, and the radiation and reception patterns.

In a preferred embodiment of the present invention, a first system user (calling party) uses a communication device to access (call) a second system user (called party). The process is started when the calling party dials the called party's mobile communication unit directory number or mobile communication unit integrated services directory number (MSISDN), which uniquely identifies one, and only one communication device. When a communication device accesses a telephone set in a local exchange through MCU 110, the communication unit dials the number of the telephone set in the local exchange without dialing the MCU associated with the local exchange. There is no concern, from the calling party's point of view which radio channel between the MCU and communication system 100 is used for communication. In the preferred embodiment, each MCU 110 is capable of supporting as many as 100 radio channels into communication system 100 (FIG. 1). However, those of skill in the art will understand that more or less radio channels can be also be supported. MCU 110 provides the radio channel access into communication system 100 (FIG. 1).

In alternate embodiments, MCU is used to provide a voice connection between a satellite communication network and public or private networks in areas that cannot support a full gateway. Examples that may not be able to support a gateway include locations that have poor infrastructure, lack of an international switching center (ISC) interconnection, and financial considerations. In this case, the MCU could be considered to be relatively stationary.

To perform this function, MCU 110 (FIG. 1) may use either a public or private network such as a Private Branch Exchange (PBX) to concentrate a large number of lines into a small number of shared lines to the MCU. A PBX is an automatic telephone office serving a private customer. MCU 110 connects these shared lines to an outside communication network. In an alternate embodiment, MCU 110 connects these shared lines to a satellite in a communication system such as communication system 100 (FIG. 1) over link 115 (FIG. 1). MCU also provides service provider billing information for the users of this service.

Terrestrial station 150 (FIG. 1) performs procedures which are beyond its traditional role in a communication system including translating the phone number of a telephone set in a local network attached to an MCU and allocating a communication unit identity associated with MCU for call processing. Terrestrial station 150 can process the MCU's radio access as though it were an ordinary communication unit. Terrestrial station 150 also relays the phone number of the telephone set in local network 430 to MCU 110.

The MCU's telephony signaling implementation separates the satellite-link equipment within the MCU from the associated logical channel assignment. Where MCU 110 supports up to "n" L-band user traffic channels, "2n" pairs of international mobile subscriber identifiers (IMSI) and MSISDNs (IMSI/MSISDN pairs) are assigned to the MCU. Each IMSI preferably can uniquely identify a communication channel, and this can be determined in the MCU at time of service subscription by the service provider.

In a preferred embodiment, each MCU is under the management of a serving gateway and a service operator. The MCU can support n users identified with n IMSIs. In a preferred embodiment, the users are required to register their IMSI with the HGW, and are assigned an associated TMSI.

In the MCU case, a communication unit in an outside communication system calls a party on an MCU. The calling GW initiates a call to the called GW using the MSRN. In another embodiment, the calling GW routes the call to the called GW, then queries the memory devices for the MSRN. The called GW uses the MSRN to determine a temporary ID such as a temporary mobile subscriber identification (TMSI) of the called party. The called GW proceeds with call setup to the communication unit specified by the temporary ID. A TMSI is a unique identity temporarily allocated to visiting communication devices. The TMSI is preferably a communication device's network address in the communication system and is preferably assigned by the VLR at registration.

The ETC within the MCU's GW intercepts the memory devices query containing the called number. The ETC reformats this message into a reformatted query by substituting an idle MSISDN for the called number. The idle MSISDN is selected from internal IMSI/MSISDN tables. The reformatted memory query is sent to the memory devices within the MCU's HGW. The memory returns the associated MSRN of the called (and reserved) MSISDN. The called GW proceeds with the call setup as though the call is a communication unit to communication unit call. Channel allocation is carried out by the MCU upon receipt of the TMSI associated with the MSRN.

FIG. 5 illustrates a flowchart of a procedure for providing identification information for an MCU located on a mobile vehicle and providing user service information for a group of communication system users located on-board the mobile vehicle to a communication system in accordance with a preferred embodiment of the present invention. The procedure is performed by an MCU located on the mobile vehicle. In other embodiments, the MCU is not located on a mobile vehicle. In addition, alternate embodiments are envisioned which have multiple MCUs at the same location In a preferred embodiment, at least one MCU which is located with a mobile vehicle provides the communication link with the communication satellites. In a preferred embodiment, a local network is also located with the vehicle. The local network and MCU are provided by service providers. The procedure starts in step 502. For example, step 502 could be the result of a passenger or a group of passengers boarding an aircraft.

In step 504, the identification information for the MCU on the mobile vehicle is determined. In a preferred embodiment, the MCU is identified using an International Mobile Equipment Identity (IMEI) number. In step 506, the MCU obtains user service information from at least one user via the local network which can be a group of communication units. These users typically are passengers of the mobile vehicle.

The local network can comprise, for example, telephone handsets (e.g., airplane seatback handsets), faxes, computers, or data processing units which are coupled to the MCU using hard wired, optical, or RF links.

One or more users can request registration or the MCU can perform a multiple user registration. In the case of a multiple user registration, the MCU can collect the registration information, for example, by prompting each potential system user to enter his or her registration information. Each potential user who wishes to register with the communication system can then enter their registration information. Registration information can be entered, for example, by entering digits into a keypad or by inserting a magnetically coded card or the user device can determine the necessity to register autonomously from the user. In a preferred embodiment, the communication system user is identified by a Subscriber Information Module (SIM). The MCU collects the registration information.

In step 508, the MCU then creates a combined request message which comprises the identification information for the MCU and the user service information from at least one of the multiple users. In alternate embodiments, the MCU could incorporate the combined information into multiple messages, for example, if messaging protocols only allow messages of a certain length.

In a preferred embodiment, the combined request message also includes location information which can be derived by the MCU (e.g., using geolocation). Location information is only required for the MCU since all of the passengers on board the vehicle will only be geo-located to this resolution. Geo-location information is necessary for the system to know where to contact the user. Geo-location information is also necessary for determining rate charges for the use of the MCU which are reported to the service provider and rate charges for the use of the communication system. Geo-location information is also important for access denial. Service provider agreements can be based on geo-physical and political boundaries. In which case, certain restrictions may be applied to particular MCUs bases on service provider boundaries. In addition, local interference restrictions may also prevent an MCU from operating at a particular location at a particular time. In an alternate embodiment, the location information can be derived using satellites in the communication system, for example, using Doppler and time delay measurements.

In step 510, in a preferred embodiment, the combined request message is encrypted. Although encryption is not necessary to the present invention, encryption is useful to protect the user service information from acquisition by parties who could use the information for illegitimate purposes. For example, encryption protects the identification number for the MCU and the user's location from being compromised. In one alternate embodiment, the combined request message is not encrypted. In another alternate embodiment, the identification number for the MCU and the user service information for each user is separately encrypted before creating the combined request message.

In step 512, the MCU then sends the unencrypted or encrypted combined request message to the communication system. Typically the MCU sends the message over an RF link between the MCU and the communication system. However, a vehicle which can communicate over hard-wired links (e.g., a mobile vehicle riding on a rail) could send the message over a hard-wired link such as through a rail. In alternate embodiments, terrestrial links or a combination of space-based and terrestrial links could be used.

In step 514, the system receives and processes the combined request message.

In step 516, the system transmits a response message to the MCU.

In step 518, the MCU receives and processes the response message from the communication system. The response message indicates whether or not the MCU has been successfully identified. In some cases, the response message can indicate whether or not the MCU was successfully geo-located. The response message also indicates which user or users the communication system has successfully registered and/or which user or users the communication system has not successfully registered.

In step 520, the MCU then informs each user via the local network of his or her registration status (i.e., as either successful or unsuccessful). In alternate embodiments, the MCU could only inform those users who have not been successfully registered, or could only inform those users who have been successfully registered. In another alternate embodiment, the MCU could inform a user of his or her registration status only when the user attempts to establish a communication link with a non-passenger. Procedure 500 proceeds to step 522 and ends.

FIG. 6 illustrates a flowchart of a billing and settlement procedure for an MCU and one or more users in accordance with a preferred embodiment of the present invention. In a preferred embodiment, procedure 600 is performed by a terrestrial station (150, FIG. 1). Procedure starts with step 602. For example, step 602 could be the result of an MCU requesting service in response to a passenger or a group of passengers boarding an aircraft and inserting their identification into a local network connected to the MCU on board the aircraft.

In step 604, the terrestrial station responsible for billing receives a combined request message from one of a plurality of MCUs. In an alternate embodiment, another terrestrial station could be used and this terrestrial station sends billing information to the terrestrial station responsible for billing this MCU.

In a preferred embodiment, where the combined request message is received in an encrypted form, the terrestrial station decrypts the combined request message in step 606.

In step 608, the terrestrial station separates the combined request message into identification information for the MCU, geo-location information for the MCU, and individual user service information for each user of the group requesting service.

In step 610, the terrestrial station processes the information. The terrestrial station uses the identification information for the MCU to determine which service provider must be recorded in the billing record and to determine applicable charging rates. Different service providers can have different lists for currently valid users and the terrestrial station responsible for billing can use this information to deny service to one or more users in the group of user onboard the mobile vehicle.

The terrestrial station also determines the present location information for the MCU and whether or not the location information is accurate enough and/or current enough to use. Additional information concerning the MCU could be used to determine the expected velocity of the mobile vehicle. For example, mobile vehicles could be classified as low velocity or high velocity vehicles. This velocity information could be used to determine a service provider's charging rates since higher cost equipment may have to be provided and factored into the charging rate.

In step 612, the terrestrial station responsible for billing or another terrestrial station in the communication system attempts to register each user individually that requested registration. An individual registration attempt involves sending the individual registration information to the home GW for the user associated with the registration information. Each home GW then determines whether the user can be registered and returns an indication of the success or failure of the registration attempt to the registering gateway which is the terrestrial station responsible for billing or another terrestrial station in the system.

In step 614, the terrestrial station sends a response message to the MCU. The terrestrial station combines the response to the identification information for the MCU, the response to the geo-location information, and the results of individual registration attempts for each of the users requesting registration. When all results are combined, or when a time-out condition occurs, the terrestrial station creates a response message. In an alternate embodiment, more than one response message is created. Multiple response messages could be created, for example, when message protocols allow messages only of a certain length. Procedure 600 then ends in step 616.

In an alternate embodiment, procedure 600 could be performed by a terrestrial station in conjunction with a system control center.

For purposes of this description, when a message is transferred along a communication path between an MCU and a terrestrial station, the particular transmission medium and number of intermediate nodes which comprise the path are not important to the invention and can be varied depending on the system. For example, a communication path between an MCU and a terrestrial station might include an RF link between the MCU and a satellite, several cross-links between satellites, a down-link to a first terrestrial station, and land-line links between the first terrestrial station and the final terrestrial station. A different communication path might include an RF link between an MCU and a first terrestrial station, and one or more bent-pipe satellite connections between the first terrestrial station and the final terrestrial station. Any number of different communication paths could be used.

For incoming calls (to the MCU), the terrestrial station identifies which communication system user is being called and updates the billing record for that particular user. The equipment IMEI is provided so that the service provider's identification can also be determined so that the billing record maintains a record of the services provided by this particular service provider. Location information is also determined so that rate charges can be properly calculated.

For outgoing calls (from the MCU), the terrestrial station identifies which communication system user is calling and updates the billing record for that particular user. Billing records can show all calls both those that were successful and those that were not successful. The equipment IMEI is provided so that the service provider's identification can also be determined so that the billing record maintains a record of the services provided by this particular service provider. Location information is also determined so that rate charges can be properly calculated.

When physical resources are not available, the MCU does not respond to the request for services. This can cause the MSC to time-out. Upon timing-out, the MSC activates the appropriate services as determined by the service provider.

The MCU can assign a separate TMSI to each radio transceiver along with the common IMEI since each transceiver can be dedicated to a particular call. The radio transceiver is preferably functionally equivalent to a mobile station of the cellular communication system being used.

Currently in the prior art, the only identities made available to the billing and settlement system are the identities contained on the Subscriber Identity Module (SIM). These identities include the identity of the provisioning service provider and the identity of the communication system user. However, secondary service providers such as those providing aeronautical services may wish to provision an airplane with a MCU which would allow the insertion of a previously provisioned SIM (from a privately owned ISU, for instance). This allows the SIM owner to maintain identity information such as phone number. Because in the prior art, the system only knows what is contained in the SIM information, and the identity of the secondary service provider is not provided. Hence, the billing and settlement system is not be able to credit the secondary service providers for the use of their equipment. The method and apparatus of the present invention provide the needed information to the billing and settlement system.

In summary, by combining MCU equipment identification information (IMEI), geo-location information and user service information for multiple communication system users, the procedure and apparatus of the present invention enable billing individuals or individual members of a group of communication system users who are using service provider furnished communications equipment either separately or located together in a mobile vehicle.

What is claimed is:

1. A method for establishing a billing record for individual members of a group of communication system users, said individual members using a multiple-user communication unit (MCU) to communicate within a communication system, said method comprising said steps of:

creating at least one combined request message which comprises equipment identification information, location information, and individual registration information for each of said users;

sending said at least one combined request message to said communication system so that said communication system can establish said billing record for said individual members for each of said individual members;

positioning said MCU on a mobile vehicle; and positioning said individual members at said mobile vehicle.

2. The method as claimed in claim 1, further comprising the step of:

obtaining said equipment identification information, said equipment identification information for identifying said MCU.

3. The method as claimed in claim 1, further comprising the step of:

obtaining said location information, said location information for locating said MCU.

4. The method as claimed in claim 1, further comprising the step of:

collecting individual registration information for said individual members, said individual members requesting registration with said communication system.

5. The method as claimed in claim 1, further comprising the step of:

receiving, at said MCU, at least one response message from said communication system which indicates an equipment identification status for said MCU, a location status for said MCU, and registration status for said individual members requesting registration.

6. The method as claimed in claim 5, further comprising the steps of:

determining that certain ones of said individual members requesting registration which were successfully registered with said communication system, said certain ones having a registration status that is true; and informing said certain ones which were successfully registered with said communication system that registration was successful.

7. The method as claimed in claim 5, further comprising the steps of:

determining that other ones of said individual members requesting registration which were not successfully registered with said communication system, said other ones having a registration status that is false; and informing said other ones which were not successfully registered with said communication system that registration was not successful.

8. The method as claimed in claim 5, further comprising the steps of:

sending said equipment identification information when said identification status is false; and not sending said equipment identification information when said equipment identification status is true.

9. The method as claimed in claim 5, further comprising the steps of:

obtaining new location information for said MCU when said location status is false;

sending said new location information when said location status is false; and not obtaining said new location information when said location status is true.

10. The method as claimed in claim 1, wherein said sending step further comprises the step of:

encrypting said at least one combined request message prior to performing said sending step.

11. A method of operating a terrestrial station for providing at least one service provider with billing information concerning a multiple-user communication unit (MCU) provided by said at least one service provider, wherein said MCU is used by communication system users to communicate with a communication system, said method comprising the steps of:

receiving, from said MCU, at least one combined request message which comprises equipment identification information for said MCU, location information for said MCU, and individual registration information for said communication system users, said communication system users requesting registration with said communication system;

establishing a billing record for each of said communication system users; and providing said billing record to said at least one service provider.

12. The method as claimed in claim 11, wherein said establishing step further comprises the steps of:

processing said equipment identification information, said location information, and said individual registration information obtained from said at least one combined request message;

determining an identification number for said MCU from said identification information;

determining said at least one service provider from said identification number; and preventing certain users from being registered, said certain users are those which are not allowed to use said MCU.

13. The method as claimed in claim 11, wherein said establishing step further comprises the steps of:

determining a location for said MCU from said location information;

determining at least one political entity from said location; and preventing certain users from being registered, said certain users are those which are not allowed to use said MCU in said at least one political entity.

14. The method as claimed in claim 11, wherein said establishing step further comprises the steps of:

determining a location for said MCU from said location information;

comparing said location with operational boundaries for said terrestrial station;

determining at least one political entity from said location; and preventing certain users from being registered, said certain users are those which are not allowed to use said MCU in said at least one political entity.

15. The method as claimed in claim 11, wherein said establishing step further comprises the steps of:

making individual registration attempts for each of said communication system users requesting registration using said individual registration information;

determining which of said communication system users requesting registration were successfully registered with said communication system; and establishing a billing record for each of said communication system users requesting registration which were successfully registered with said communication system.

16. The method as claimed in claim 11, further comprising the steps of:

accumulating billing records for each of said communication system users;

creating at least one combined billing record which comprises said billing records for each of said communication system users; and sending said at least one combined billing record to a billing center.

17. The method as claimed in claim 11, wherein said at least one combined request message is received in an encrypted form, said method further comprising the step of:

decrypting said at least one combined request message prior to performing said establishing step.

18. A multiple-user communication unit (MCU), said MCU being located with at least one communication system user, said MCU being used by said at least one communication system user to communicate with a communication system, said MCU comprising:

an interface for establishing at least one communication link with said communication system;

a processor coupled to said interface, said processor for determining equipment identification information, location information, and individual registration information, creating at least one combined request message which comprises said identification information, said location information, and said individual registration information, and sending said at least one combined request message to said interface; and a local network interface coupled to said processor, said local network interface for interfacing between said processor and at least one local network.

19. The MCU as claimed in claim 18, further comprising:

encrypting means for encrypting data coupled between said processor and said interface, said encrypting means for encrypting said at least one combined request message prior to said RF interface transmitting said at least one combined request message.

20. The MCU as claimed in claim 18, further comprising:

a memory device for storing said equipment identification information, said location information, and said individual registration information.

21. The MCU as claimed in claim 18, further comprising:

a geo-location device for providing said location information.

22. A terrestrial station in a communication system comprising:

an earth terminal for receiving at least one combined request message from a multiple-user communication unit (MCU) and for transmitting at least one response message to said MCU; and an earth terminal controller coupled to said earth terminal, said earth terminal controller for processing said at least one combined request message, wherein said at least one combined request message comprises equipment identification information, location information, and individual registration information individual registration information from multiple communication system users who are using said MCU, said earth terminal controller further for identifying said MCU from said equipment identification information, for determining at least one service provider, for determining which of said multiple communication system users were successfully registered, and for establishing a billing record for each of said multiple communication system users which were successfully registered with said communication system.

23. The terrestrial station as claimed in claim 22, wherein said earth terminal controller includes means for accumulating results of individual registration attempts for each of said multiple communication system users, for creating at least one response message which comprises said results, and for sending said at least one response message to said MCU.

24. The terrestrial station as claimed in claim 22, wherein said earth terminal controller includes means for accumulating results of individual registration attempts for each of said multiple communication system users, for creating at least one response message which comprises said results, and for sending said at least one response message to a billing facility that is responsible for creating billing records for said multiple communication system users.

25. The terrestrial station as claimed in claim 22, wherein said earth terminal controller includes means for accumulating results of individual call setup attempts for each of said multiple communication system users, for creating at least one response message which comprises said results, and for sending said at least one response message to a billing facility that is responsible for creating billing records for said multiple communication system users.

26. The terrestrial station as claimed in claim 22, wherein said earth terminal controller includes means for accumulating results of individual calls for each of said multiple communication system users, for creating at least one response message which comprises said results, and for sending said at least one response message to a billing facility that is responsible for creating billing records for said multiple communication system users.

27. The terrestrial station as claimed in claim 22, wherein said earth terminal controller includes means for identifying a service provider for each of said multiple communication system users, for creating at least one response message which comprises service provider billing information, and for sending said at least one response message to a billing facility that is responsible for creating billing records for said multiple communication system users.

* * * * *